(12) United States Patent
Smith (10) Patent No.: US 11,095,336 B1
(45) Date of Patent: Aug. 17, 2021

(54) CYCLIC CHIRP CALIBRATION

(71) Applicant: Raytheon Company, Waltham, MA (US)

(72) Inventor: Jason R. Smith, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/925,612

(22) Filed: Jul. 10, 2020

(51) Int. Cl.
 *H04B 1/69* (2011.01)
 *H04B 17/11* (2015.01)

(52) U.S. Cl.
 CPC .............. *H04B 1/69* (2013.01); *H04B 17/11* (2015.01); *H04B 2001/6912* (2013.01)

(58) Field of Classification Search
 CPC ... H04B 1/69; H04B 17/11; H04B 2001/6912
 See application file for complete search history.

(56) References Cited

U.S. PATENT DOCUMENTS

| | | | |
|---|---|---|---|
| 5,708,463 A * | 1/1998 | Hirabayashi | B41J 2/2132 347/43 |
| 5,963,607 A * | 10/1999 | Romano | G06F 1/0328 327/106 |
| 6,084,545 A | 7/2000 | Lier et al. | |
| 7,336,748 B2 * | 2/2008 | Messier | G06F 1/0328 375/354 |
| 7,580,964 B2 * | 8/2009 | Merlo | G06F 1/022 327/105 |
| 7,787,533 B2 * | 8/2010 | Atherton | G01S 7/282 375/229 |
| 8,503,593 B2 * | 8/2013 | Katz | G06F 1/10 375/371 |
| 9,791,484 B2 | 10/2017 | Pailloncy et al. | |
| 2005/0129139 A1 * | 6/2005 | Jones | G01S 5/14 375/295 |
| 2007/0297523 A1 | 12/2007 | Cattaneo et al. | |

OTHER PUBLICATIONS

Eva Murphy, Colm Slattery, Ask the Application Engineer—33, All About Direct Digital Synthesis, Analog Dialogue 38-08, Aug. 2004, pp. 1-5, 5 pages.

* cited by examiner

*Primary Examiner* — Freshteh N Aghdam
(74) *Attorney, Agent, or Firm* — Daly, Crowley, Mofford & Durkee, LLP (57) ABSTRACT

A method, comprising: generating, by a signal source, a continuous chirp signal the chirp signal being generated by converting to analog form a plurality of digital samples, each of the plurality of digital samples being calculated, at least in part, by: (i) incrementing a first counter by a frequency slope value, (ii) incrementing a second counter by a current value of the first counter, and (iii) evaluating a periodic function based on a current value of the second counter; and transmitting the chirp signal from the signal source to a signal receiver, the chirp signal being transmitted over a communications channel that couples the signal source to the signal receiver, the chirp signal being transmitted as part of a test for detecting a phase response of the communications channel.

20 Claims, 8 Drawing Sheets

CYCLIC CHIRP CALIBRATION

BACKGROUND

Direct digital synthesis (DDS) is a method for generating an analog waveform by producing a time-varying signal in digital form and then converting the signal to analog format. Waveforms generated by DDS are frequently used in the calibration and testing of various types of equipment, such as communications equipment. Because operations within DDS are mostly digital, DDS offers fast switching between output frequencies, fine frequency resolution, and operation over a broad spectrum of frequencies. Waveforms produced by using DDS tend to have low phase noise and low spurious performance.

SUMMARY

According to aspects of the disclosure, a method is provided, comprising: generating, by a signal source, a continuous chirp signal, the chirp signal being generated by converting to analog form a plurality of digital samples, each of the plurality of digital samples being calculated, at least in part, by: (i) incrementing a first counter by a frequency slope value, (ii) incrementing a second counter by a current value of the first counter, and (iii) evaluating a periodic function based on a current value of the second counter; and transmitting the chirp signal from the signal source to a signal receiver, the chirp signal being transmitted over a communications channel that couples the signal source to the signal receiver, the chirp signal being transmitted as part of a test for detecting a phase response of the communications channel, wherein the chirp signal has a frequency that changes in a cyclical pattern, and the first counter is arranged to wrap at the end of each frequency cycle of the chirp signal.

According to aspects of the disclosure, a method is provided, comprising: receiving a chirp signal at a signal receiver and digitizing the chirp signal to produce a first plurality of digital samples, the chirp signal being received from a signal source over a communications channel; generating the chirp signal locally, at the signal receiver, by calculating a second plurality of digital samples, each of the second plurality of digital samples being calculated, at least in part, by: (i) incrementing a first counter by a frequency slope value, (ii) incrementing a second counter by a current value of the first counter, and (iii) evaluating a periodic function based on a current value of the second counter; and identifying a phase response of the communications channel based on a difference between the received chirp signal phase and the generated chirp signal phase, wherein the chirp signal has a frequency that changes in a cyclical pattern, and the first counter is arranged to wrap at the end of each frequency cycle of the chirp signal.

According to aspects of the disclosure, an apparatus is provided for generating a cyclical chirp signal, comprising: a first modulo counter that is incremented by a frequency slope value; a second modulo counter that is incremented by a current value of the first modulo counter, the second modulo counter being incremented once each time the first modulo counter is incremented; a computation module that is configured to generate a different respective digital sample each time the second modulo counter is incremented, the respective digital sample being generated, at least in part, by evaluating a periodic function based on a current value of the second modulo counter; and a digital-to-analog converter that is configured to receive each respective digital sample that is generated by the computation module, convert the respective digital sample to analog format, and output the converted digital sample as part of the chirp signal.

BRIEF DESCRIPTION OF THE DRAWINGS

The foregoing features may be more fully understood from the following description of the drawings in which.

DETAILED DESCRIPTION

Figure 1A:
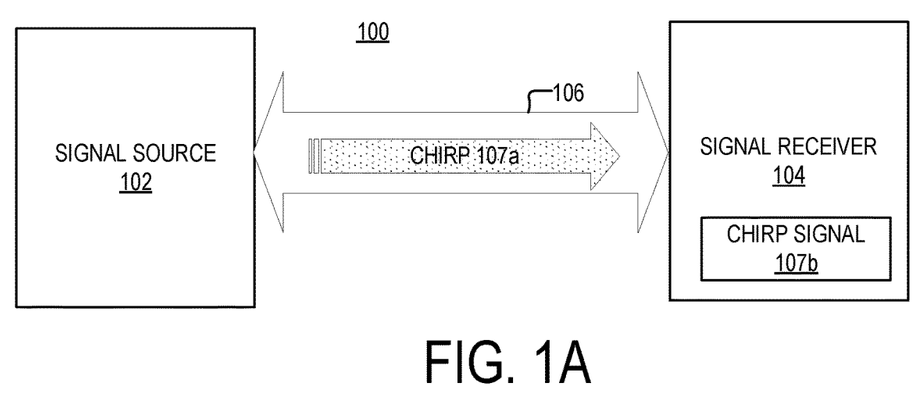
FIG. 1A is a diagram of an example of a system, according to aspects of the disclosure.

FIG. 1A is a diagram of an example of a system 100, according to aspects of the disclosure. As illustrated, the system 100 may include a signal source 102 that is coupled to a signal receiver 104 via a communications channel 106. The signal source 102 may include a DDS function generator, a waveform generator, and/or any other suitable type of device that is configured to perform direct digital synthesis (DDS). The signal receiver 104 may include one or more of a signal analyzer, a high-speed sampling oscilloscope, and/or any other suitable type of device that is configured to receive and analyze signals that are generated by the signal source 102. According to the present example, the communications channel 106 includes a wired medium. However, alternative implementations are possible in which the communications channel includes another type of medium, such as a wireless medium or an optical medium, for example.

In operation, the signal source 102 may generate a chirp signal 107a. The signal source 102 may transmit the chirp signal 107a, over the communications channel 106, to the signal receiver 104. The signal receiver 104 may receive the chirp signal 107a. Next, the signal receiver 104 may calculate the chirp signal 107a locally. Next, the signal receiver 104 may determine a phase response of the communications channel 106 based on a phase difference between the received chirp signal 107a and the calculated chirp signal 107a. For example, the signal receiver 104 may determine the phase response of the communications channel 106 (at least in part) by subtracting, in the frequency domain, the calculated chirp signal 107a from the received chirp signal 107a. As another example, the signal receiver 104 may perform a complex divide of in-phase and quadrature (I/Q) samples of the calculated chirp signal 107a and the received chirp signal 107a, respectively, and then use the result to compute the phase response of the communications channel 106. Afterwards, the signal source 102 may calculate, in a well-known fashion, a set of compensation parameters for the communications channel 106. The compensation parameters may be calculated based on the determined phase response. The compensation parameters may be used by the signal receiver 104, or another device, to correct receive errors on the communications channel 106 to a desired phase response.

Figure 1B:
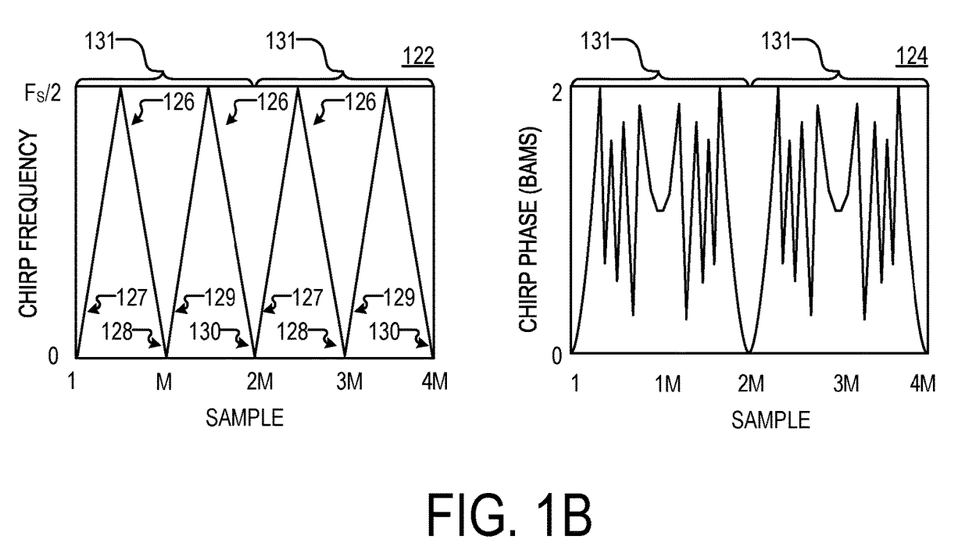
FIG. 1B is a plot of the phase and frequency of a chirp signal, according to aspects of the disclosure.

FIG. 1B shows characteristics of the chirp signal 107a in further detail. More particularly, FIG. 1B shows a plot 122 of the frequency of the chirp signal 107a and a plot 124 of the phase of the chirp signal 107a.

Plot 122 illustrates that the frequency of the chirp signal 107a may change in a first cyclical pattern. More particularly, the chirp signal 107a may be a linear frequency ramp that has a plurality of frequency cycles 126, with each frequency cycle 126 having either: (i) a first Nyquist zone 127 and a second Nyquist zone 128 or (ii) a third Nyquist zone 129, and a fourth Nyquist zone 130. As can be readily appreciated, the second 128, third 129, and fourth 130 Nyquist zones may be caused by aliasing or folding of the upper components of the chirp signal 107a into the operating band of the chirp signal 107a. The number of Nyquist zones that are present in the chirp signal 107a may depend on the sampling rate (at the signal source 102) of the chirp signal 107a. Although, in the present example, the chirp signal 107a includes four Nyquist zones, it will be understood that the present disclosure is not limited to any number of Nyquist zones being present in the chirp signal. The chirp signal 107a may be generated by calculating a first plurality of digital samples and converting each of the digital samples to analog format. Each frequency cycle 126 of the chirp signal 107a may be generated based on (and/or include) M digital samples, where M is a positive integer greater than 1. Each frequency cycle 126 of the chirp signal 107a may begin with the chirp signal 107a assuming the same initial frequency (e.g., 0 GHz). Furthermore, the frequency range of each frequency cycle 126 of the chirp signal 107a may span between 0 and Fs/2 Hz, where Fs is the sampling rate at which the signal source 102 generates digital samples of the chirp signal 107a (e.g., digital samples/second).

Plot 124 illustrates that the phase of the chirp signal 107a may change in a second cyclical pattern. More particularly, the chirp signal 107a may include phase cycles 131. Each of the phase cycles 131 may have a duration that is twice as long as the duration of the frequency cycles 126. Each of the phase cycles 131 may start at the same time as one of the frequency cycles 126 and end at the same time with the next one of the frequency cycles 126. Each of the phase cycles 131 may start at an initial value (e.g., 0 BAMS) and return to the same value at the end.

Under the arrangement shown in FIG. 1B, the frequency of the chirp signal 107a may change in synch with changes in the phase of the chirp signal 107a. This may cause the chirp signal 107a to have a predictable mapping between phase and frequency. Each frequency in the first Nyquist zone 127 may be mapped to at most one phase value in the waveform of the chirp signal 107a. Each frequency in the second Nyquist zone 128 may be mapped to at most one phase value in the waveform of the chirp signal 107a. Each frequency in the third Nyquist zone 129 may be mapped to at most one phase value in the waveform of the chirp signal 107a. And each frequency in the fourth Nyquist zone 128 may be mapped to at most one phase value in the waveform of the chirp signal 107a. In each of Nyquist zones 127-130 the chirp signal 107a may or may not have a different phase at the same frequency. In other words, in the example of FIGS. 1A-B, for every M samples, there may be two repetitions of a given frequency, with each repetition having a unique phase value, which may or may not be numerically equal to the phase value of the other repetition. Moreover, it will be understood that multiple frequencies in the same Nyquist zone may have a very numerically similar phase, but nevertheless each frequency (in the frequency band of the Nyquist zone) will map to only one unique phase value.

For example, in Nyquist zone 127, the chirp signal 107a may have a first phase (e.g., 0.1 BAMS) at all times when the chirp signal has a frequency $F_1$ (e.g., 1.5 GHz, etc.). In the second Nyquist zone 128, the chirp signal 107a may have a second phase (e.g., 0.2 BAMS) at all times when the chirp signal has the same frequency $F_1$ (e.g., 1.5 GHz, etc.). In the third Nyquist zone 129, the chirp signal 107a may have a third phase (e.g., 0.3 BAMS) at all times when the chirp signal 107a has the same frequency $F_1$ (e.g., 1.5 GHz, etc.). And in the fourth Nyquist zone 130, the chirp signal 107a may have a fourth phase (e.g., 0.4 BAMS) at all times when the chirp signal 107a has the same frequency $F_1$ (e.g., 1.5 GHz, etc.). In the example of FIG. 1B, each of the Nyquist zones 127-130 repeats every 2M samples. When the first Nyquist zone 127 repeats, the phase of the chirp signal 107a will return to the first phase (value) at frequency $F_1$. When the second Nyquist zone 128 repeats after, the phase of the chirp signal 107a will return to the second phase (value) at the frequency $F_L$. When the third Nyquist zone 129 repeats, the phase of the chirp signal 107a will return to the third phase (value) at the frequency $F_1$. And when the fourth Nyquist zone 130 repeats, the phase of the chirp signal 107a will return to the fourth phase (value) at frequency $F_1$.

In some respects, conventional techniques for channel calibration require a known phase (and time) reference for determining the phase response of a channel. Establishing such known reference may be difficult and prone to errors. By contrast, using the chirp signal 107a for channel calibration does not require a known phase (and time reference). Because in each of Nyquist zones 127-130 there is a predictable mapping between frequency and phase, no external phase reference is necessary to use the chirp signal 107a. Rather, a phase (and time) reference may be extracted directly from the chirp signal 107a in postprocessing.

According to aspects of the disclosure, the chirp signal 107a is a continuous analog signal (as opposed to a pulse). Having the chirp signal 107a be a continuous signal is advantageous because it eliminates trigger uncertainty error, which is present in conventional approaches that utilize swept pulsed continuous-wave (CW) signals for channel calibration. The frequency range of the chirp signal 107a is capable of being set to match the frequency band of the communications channel 106, thereby allowing the frequency response of the communications channel 106 to be tested across the entire band. Moreover, as noted above, the phase of the chirp signal 107a is matched to the frequency of the chirp signal 107a, which causes the chirp signal 107a to have: (i) the same respective phase at any given frequency in the first Nyquist zone 127, (ii) the same respective phase at any given frequency in the second Nyquist zone 128, (iii) the same respective phase at any given frequency in the third Nyquist zone 129, and (iv) the same respective phase at any given frequency in the fourth Nyquist zone 130. This property of the chirp signal 107a is advantageous because it allows digital samples of the chirp signal 107a to be averaged (to improve the signal-to-noise ratio of the chirp signal 107a) without obfuscating any phase distortions that are imparted on the chirp signal 107a by the communications channel 106 (and/or transmit/receive circuitry).

Figure 1C:
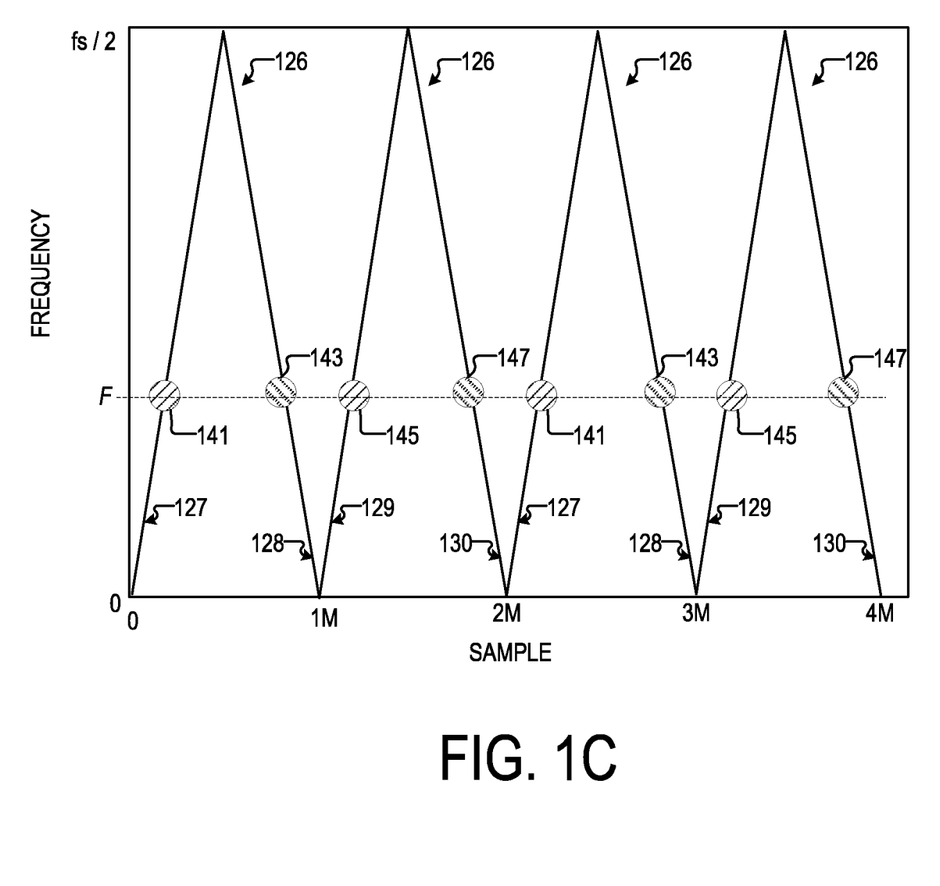
FIG. 1C is a plot of the frequency of the chirp signal of FIG. 1B, which shows a plurality of samples of the chirp signal, according to aspects of the disclosure.

FIG. 1C is a plot of the frequency of the chirp signal 107a, which illustrates in further detail operations that may be performed by the signal receiver 104 when the chirp signal 107a is received from the signal source 102. Shown in FIG. 1C are digital samples 141-147 of the chirp signal 107a. The digital samples 141-147 are generated by the signal receiver 104 (by using an analog-to-digital converter). Each of the digital samples 141 is captured when: (i) the chirp signal 107a is in the first Nyquist zone 127, (ii) the chirp signal 107a has a frequency F (e.g., 1.3 GHz), and (iii) and the chirp signal 107a has a phase $P_1$ (e.g., 0.1 BAMS). Each of the digital samples 143 is captured when: (i) the chirp signal 107a is in the second Nyquist zone 128, (ii) the chirp signal 107a has the frequency F (e.g., 1.3 GHz), and (iii) the chirp signal 107a has a phase $P_2$ (e.g., 0.2 BAMS). Each of the digital samples 145 is captured when: (i) the chirp signal 107a is in the third Nyquist zone 129, (ii) the chirp signal has the frequency F (e.g., 1.3 GHz), and (iii) the chirp signal 107a has a phase $P_3$ (e.g., 0.3 BAMS). Each of the digital samples 147 is captured when: (i) the chirp signal 107a is in the fourth Nyquist zone 130, (ii) the chirp signal 107a has the frequency F (e.g., 1.3 GHz), and (iii) the chirp signal 107a has a phase $P_4$ (e.g., 0.4 BAMS). As noted above, because the digital samples 141 are associated with the same phase $P_1$, they can be averaged (by the signal receiver 104) to produce a first average sample, without obfuscating the phase response of the communications channel (and/or transmit/receive circuitry) at frequency F. Similarly, because the digital samples 143 are associated with the same phase $P_2$, they can be averaged (by the signal receiver 104) to produce a second average sample, without obfuscating the phase response of the communications channel (and/or transmit/receive circuitry) at frequency F. Because the digital samples 145 are associated with the same phase $P_3$, they can be averaged (by the signal receiver 104) to produce a third average sample, without obfuscating the phase response of the communications channel (and/or transmit/receive circuitry) at frequency F. And because the digital samples 147 are associated with the same phase $P_4$, they can be averaged (by the signal receiver 104) to produce a second average sample, without obfuscating the phase response of the communications channel (and/or transmit/receive circuitry) at frequency F. As is discussed further below with respect to FIG. 5B, the first, second, third, and fourth average samples may be compared to values for chirp signal 107b (shown in FIG. 1A), which is calculated locally by the signal receiver 104, to determine any phase distortion that is imparted on the chirp signal 107a by the communications channel 106 (and/or transmit/receive circuitry). As can be readily appreciated, when averaging the digital samples 141-147, the signal receiver 104 may use any suitable type of anti-aliasing filter to distinguish the digital samples 141-147 from one another.

Figure 1D:
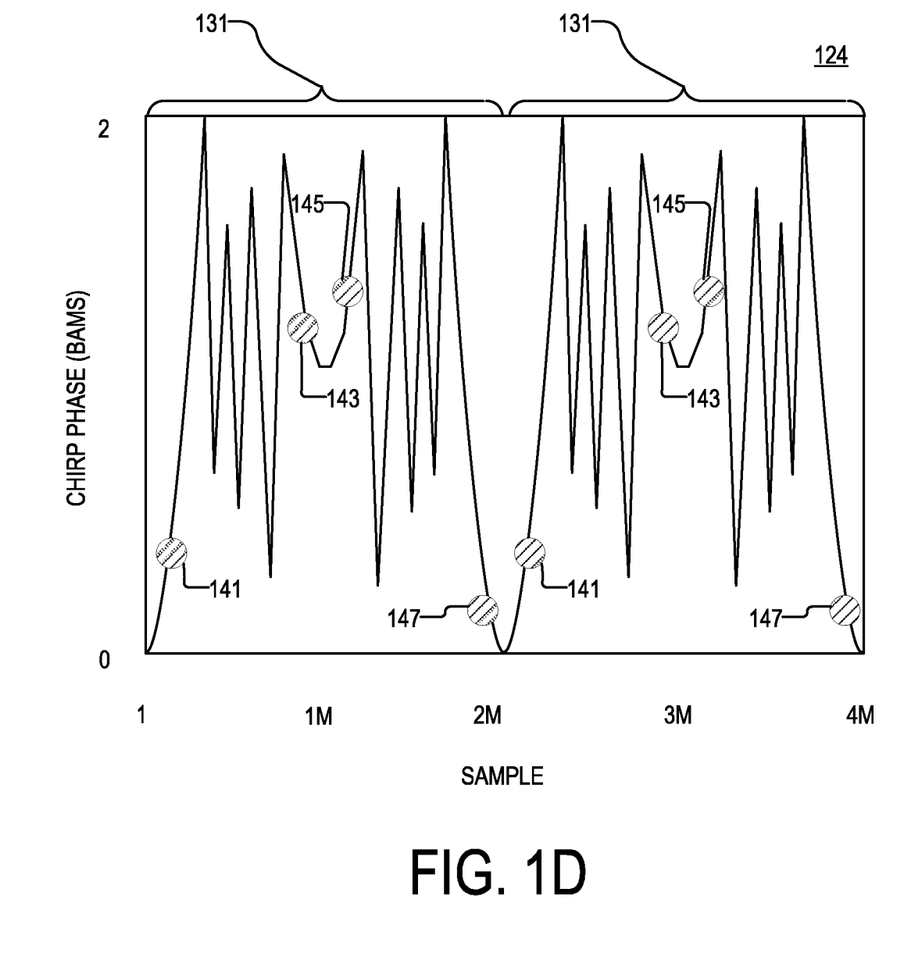
FIG. 1D is a plot of the phase of the chirp signal of FIG. 1B, which shows a plurality of samples of the chirp signal, according to aspects of the disclosure.

FIG. 1D shows a plot of the phase of the chirp signal 107a, which illustrates the respective phase of each of samples 141, 143, 145, and 147. As illustrated, each one of samples 141 may have the same respective phase; each one of samples 143 may have the same respective phase; each one of samples 145 may have the same respective phase; and each one of samples 147 may have the same respective phase.

Figure 2:
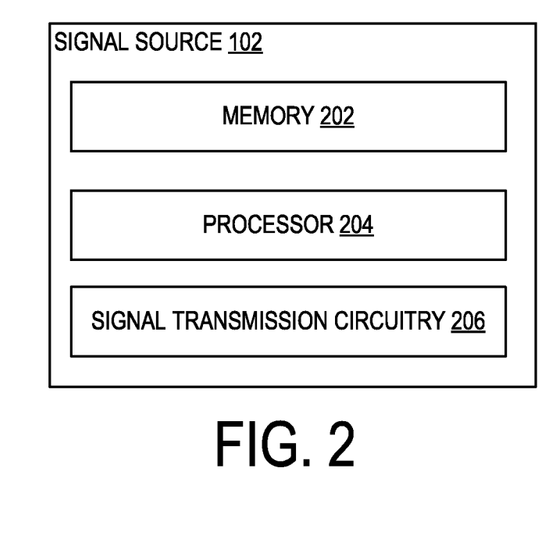
FIG. 2 is a diagram of an example of a signal source according to aspects of the disclosure.

FIG. 2 shows an example of one possible hardware architecture that can be used to implement the signal source 102. As illustrated, in some implementations, the signal source 102 may include a memory 202, a processor 204, and a signal transmission circuitry 206. The memory 202 may include one or more of a random-access memory (RAM), a solid-state drive, one or more registers, a network accessible storage (NAS), and/or any other suitable type of storage device. The processor 204 may include one or more of a special-purpose processor, a general-purpose processor, a Field-Programmable Gate Array (FPGA), and/or any other suitable type of processing circuitry. The signal transmission circuitry 206 may include any suitable type of electronic circuitry for transmitting the chirp signal 107a over the communications channel 106. According to the present example, the signal transmission circuitry 206 includes a transmitter for transmitting the chirp signal 107a over a wired medium. However, it will be understood that the signal transmission circuitry 206 may include any suitable type of transmitter, such as a wireless transmitter or an optical transmitter, for example.

Figure 3:
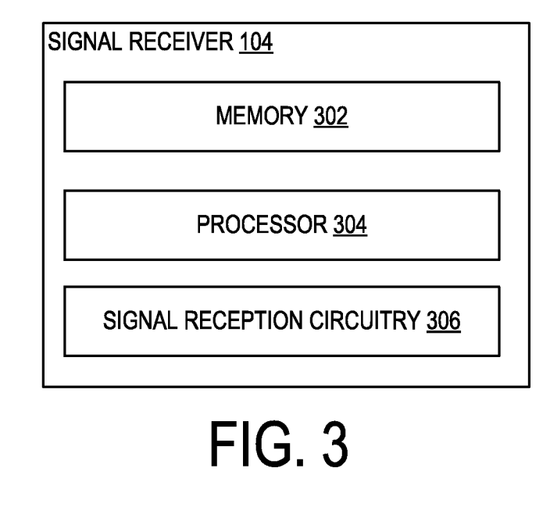
FIG. 3 is a diagram of an example of a signal receiver, according to aspects of the disclosure.

FIG. 3 shows an example of one possible hardware architecture that can be used to implement the signal receiver 104. As illustrated, in some implementations, the signal receiver 104 may include a memory 302, a processor 304, and a signal reception circuitry 306. The memory 302 may include one or more of a random-access memory (RAM), a solid-state drive, one or more registers, a network accessible storage (NAS), and/or any other suitable type of storage device. The processor 304 may include one or more of a special-purpose processor, a general-purpose processor, a Field-Programmable Gate Array (FPGA), and/or any other suitable type of processing circuitry. The signal reception circuitry 306 may include any suitable type of electronic circuitry for receiving the chirp signal 107a over the communications channel 106. According to the present example, the signal reception circuitry 306 includes a receiver for receiving the chirp signal 107a over a wired medium. However, it will be understood that the signal reception circuitry 306 may include any suitable type of receiver, such as a wireless receiver or an optical receiver, for example.

Figure 4A:
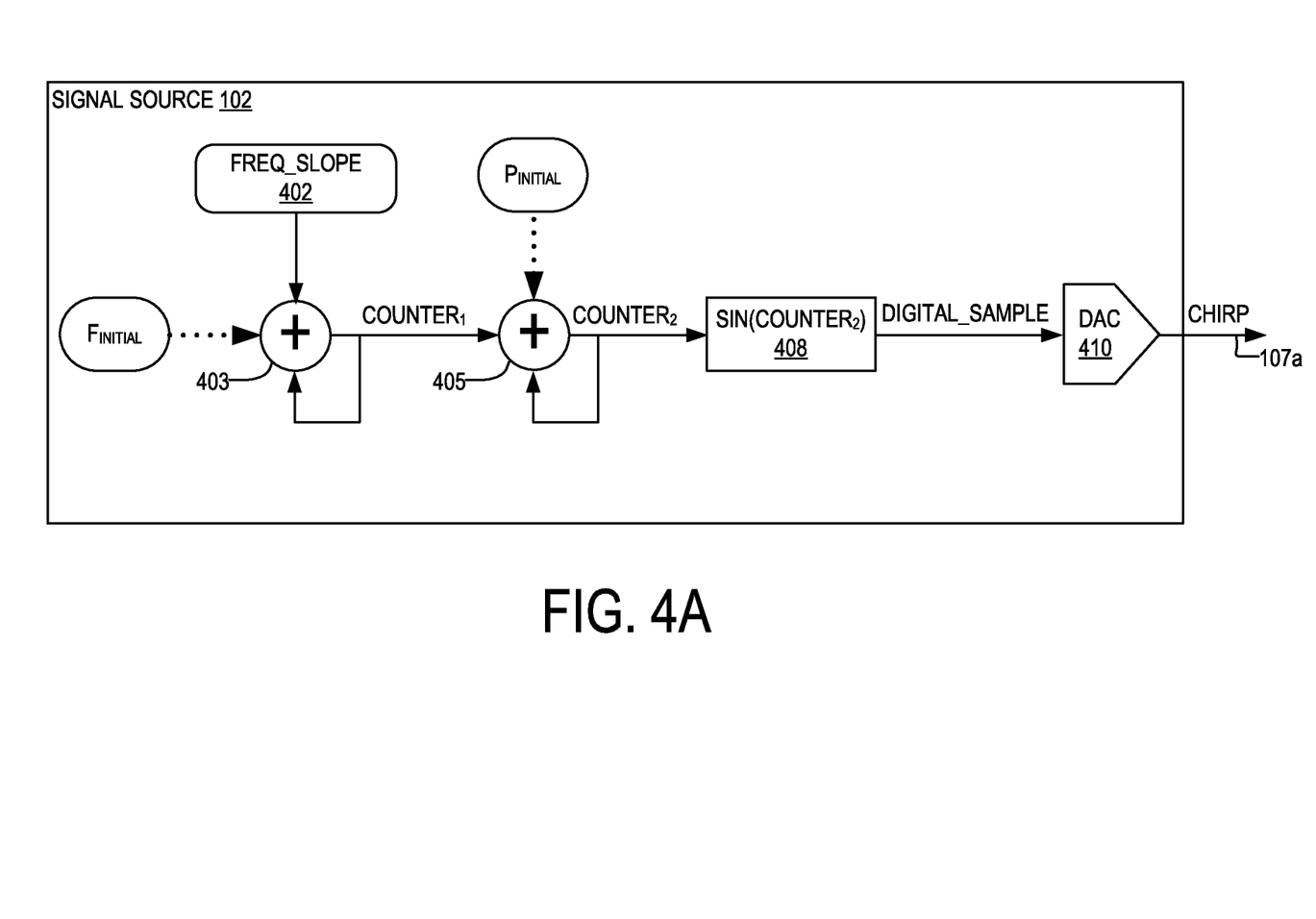
FIG. 4A is a diagram of an example of a signal source, according to aspects of the disclosure.

FIG. 4A is a diagram of another possible architecture of the signal source 102. As illustrated, the signal source 102 may include a register 402, a frequency accumulator 403, a phase accumulator 405, a computation module 408, and a digital-to-analog converter (DAC) 410.

The frequency accumulator 403 may be implemented by using a first modulo-N counter. The frequency accumulator may be configured to store a variable $COUNTER_1$ and increment $COUNTER_1$ by a value FREQ_SLOPE, which is stored in register 402. When the frequency accumulator 403 is first started, or subsequently reset, the value of $COUNTER_1$ may be set to equal a value $F_{INITIAL}$. The frequency accumulator 403 may be reset every time when the addition of FREQ_SLOPE to the current value of $COUNTER_1$ results in a sum that is greater than the maximum value, which the frequency accumulator 403 can store. As can be readily appreciated, the maximum value, which the frequency accumulator can store, is equal to $2^k-1$, where k is the bit size of the frequency accumulator 403. Resetting the frequency accumulator 403 may include setting the value of $COUNTER_1$ to equal the value $F_{INITIAL}$. In some implementations, the value FREQ_SLOPE may be matched with a carryover function of the first modulo-N counter, so as to cause $COUNTER_1$ to return automatically to the value $F_{INITIAL}$ when the maximum of the first modulo-N counter is reached.

The phase accumulator 405 may be implemented by using a second modulo-N counter. The phase accumulator 405 may be configured to store a variable $COUNTER_2$ and increment $COUNTER_2$ by the current value of $COUNTER_1$.

The phase accumulator 405 may increment $COUNTER_2$ once for each time $COUNTER_1$ is incremented by the frequency accumulator 403. When the phase accumulator 405 is first started, or subsequently reset, the value of $COUNTER_2$ may be set to equal a value $P_{INITIAL}$. The phase accumulator 405 may be reset every time when the addition of the current value of $COUNTER_1$ to the current value of $COUNTER_2$ results in a sum that is greater than the maximum value, which the phase accumulator 405 can store. As can be readily appreciated, the maximum value, which the phase accumulator can store, is equal to 2q−1, where q is the bit size of the phase accumulator 405. The bit size of the phase accumulator may be the same or different from the bit size of the frequency accumulator. Resetting the phase accumulator 405 may include setting the value of $COUNTER_2$ to equal the value $P_{INITIAL}$. In some implementations, the value FREQ_SLOPE may be matched with a carryover function of the second modulo-N counter, so as to cause $COUNTER_2$ to return automatically to the value $P_{INITIAL}$ when the maximum value of the second modulo-N counter is reached.

The computation module 408 may be configured to produce a plurality of digital samples. The computation module 408 may produce one digital sample every time $COUNTER_2$ is incremented by the phase accumulator 405. The computation module may calculate each digital sample (at least in part) by calculating the sine of the current value of $COUNTER_2$. According to the present example, the computation module 408 is implemented by using a lookup table. However, alternative implementations are possible in which the computation module 408 is implemented by using a CORDIC processor, an arithmetic-and-logic unit, and/or another type of type electronic circuit. Although, in the present example, the computation module 408 produces each digital sample by calculating the sine of the current value of $COUNTER_2$, alternative implementations are possible in which the computation module evaluates another type of periodic function based on the value of $COUNTER_2$. Furthermore, alternative implementations are possible in which the computation module 408 performs other calculations when generating each digital sample, in addition to the evaluation of the sine of the current value of $COUNTER_2$.

The DAC 410 may be configured to receive each digital sample that is generated by the computation module 408, convert the digital sample to analog form, and output the converted sample as part of the chirp signal 107a. The present disclosure is not limited to using any specific type of digital-to-analog converter in the signal source 102.

The value $F_{INITIAL}$ is equal to (or otherwise specifies) the initial frequency that is assumed by the chirp signal 107a at the beginning of each frequency cycle 126 (see FIG. 1B). According to the present example, $F_{INITIAL}$ is equal to −FREQ_SLOPE. However, alternative implementations are possible in which $F_{INITIAL}$ is greater than or equal to zero. The value $P_{INITIAL}$ is equal to (or otherwise specifies) the initial phase that is assumed by the chirp signal 107a at the beginning of each frequency cycle 126 (see FIG. 1B). According to the present example, $P_{INITIAL}$ is equal to zero. However, alternative implementations are possible in which $P_{INITIAL}$ is greater than zero.

The value FREQ_SLOPE specifies the slope of the chirp signal 107a. In some respects, the size of FREQ_SLOPE determines the resolution at which the phase response of the communications channel 106 would be determined by the signal receiver 104 (i.e., the smaller the magnitude, the greater the resolution). Furthermore, the size of FREQ_SLOPE determines the time it would take the signal receiver 104 to test the phase response of the communications channel 106. The value FREQ_SLOPE 402 may be customized by the user of the signal source 102 (e.g., by storing a desired number in register 402). Allowing the value FREQ_SLOPE to be customized by the user is advantageous because it affords the user the flexibility of controlling the resolution and/or duration of any tests that are performed on the communications channel 106.

According to the example of FIG. 4A, the frequency accumulator 403 is reset at the end of each frequency cycle 126 of the chirp signal 107a. In other words, the frequency accumulator 403 is reset after the generation of each sequence of M samples by the signal source 102. In some implementations, the bit size of the frequency accumulator 403 and/or the value FREQ_SLOPE may be selected so that the frequency accumulator 403 would reset exactly at the end of each frequency cycle 126. As noted above, when the frequency accumulator 403 is reset, the value of $COUNTER_1$ is set to equal $F_{INITIAL}$. Under the nomenclature of the present application, the act of (re)setting the value of $COUNTER_1$ to equal $F_{INITIAL}$ is also referred to as "wrapping" of $COUNTER_1$ and/or the first modulo-N counter (which is used to implement the frequency accumulator 403).

According to the example of FIG. 4A, the phase accumulator 405 is reset at the end of every other frequency cycle 126 of the chirp signal 107a. Furthermore, according to the example of FIG. 4A, the phase accumulator 405 is reset at the end of every phase cycle 131 of the chirp signal 107a. As noted above, when the frequency accumulator 403 is reset, the value of $COUNTER_2$ is set to equal $P_{INITIAL}$. In some implementations, one or more of the bit size of the frequency accumulator 403, the bit size of the phase accumulator 405, and/or the value FREQ_SLOPE may be selected so that the phase accumulator 405 would reset exactly at the end of every other frequency cycle 126. Under the nomenclature of the present application, the act of (re)setting the value of $COUNTER_2$ to equal $P_{INITIAL}$ is also referred to as "wrapping" of $COUNTER_2$ and/or the second modulo-N counter (which is used to implement the phase accumulator 405).

Figure 4B:
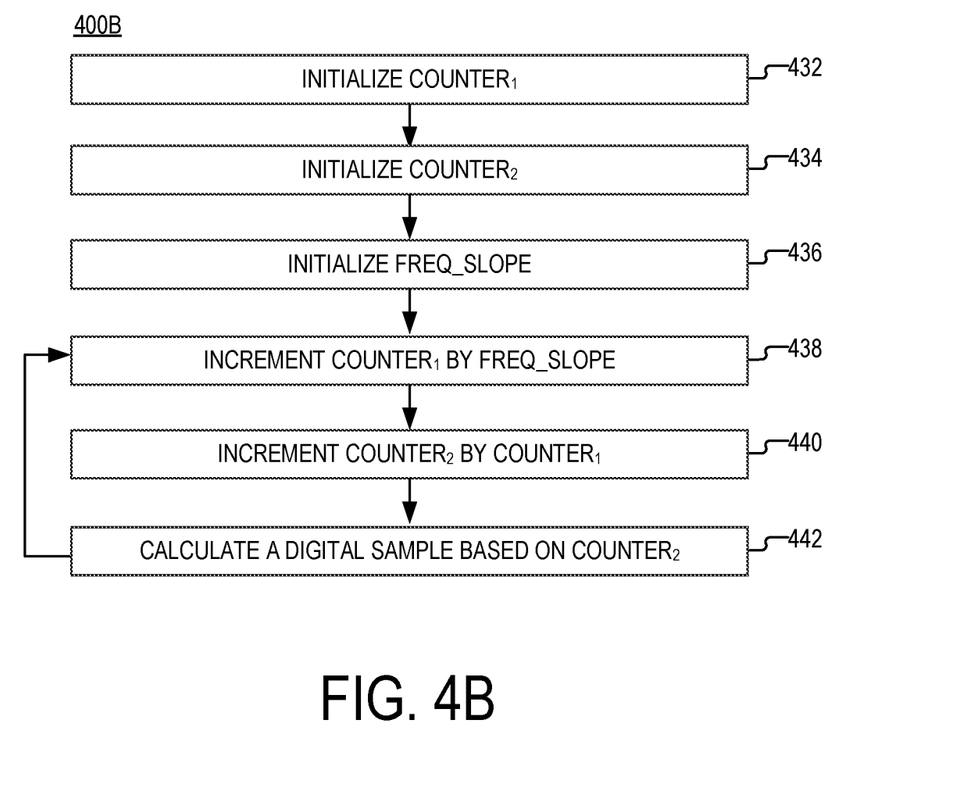
FIG. 4B is a flowchart of an example of a process according to aspects of the disclosure.

FIG. 4B is a flowchart of an example of a process 400B for calculating the chirp signal 107a. According to the present example, the process 400B is performed by the architecture shown in FIG. 4A. However, alternative implementations are possible in which the process 400B is performed by another device or architecture. At step 432, the frequency accumulator 403 initializes the value of $COUNTER_1$ to equal the value $F_{INITIAL}$. At step 434, the phase accumulator 405 initializes the value of $COUNTER_2$ to equal the value $P_{INITIAL}$. At step 436, the value FREQ_SLOPE is stored in register 402. According to the present example, $P_{INITIAL}=0$ and $F_{INITIAL}=-$FREQ_SLOPE, so that the first sample of the chirp signal 107a would have an initial frequency of 0 Hz and an initial phase of 0 BAMS in the first iteration of the process 400B. At step 438, the frequency accumulator 403 increments $COUNTER_1$ by the value FREQ_SLOPE. At step 440, the phase accumulator 405 increments $COUNTER_2$ by the current value of $COUNTER_1$. The current value of $COUNTER_1$ is the value assumed by $COUNTER_1$ after the most recent execution of step 438. At step 442, the computation module generates a digital sample based on the current value of $COUNTER_2$. The current value of $COUNTER_2$ is the value assumed by $COUNTER_2$ after the most recent execution of step 440. According to the present example, the computation calculates the digital sample, at least in part, by evaluating the sine of the current value of COUNTER$_1$. After the digital sample is calculated, the digital sample may be provided to the DAC 410 for output as part of the chirp signal 107*a*. Afterwards, the process 400B returns to step 438 and another digital sample of the chirp signal 107*a* is calculated.

Figure 4C:
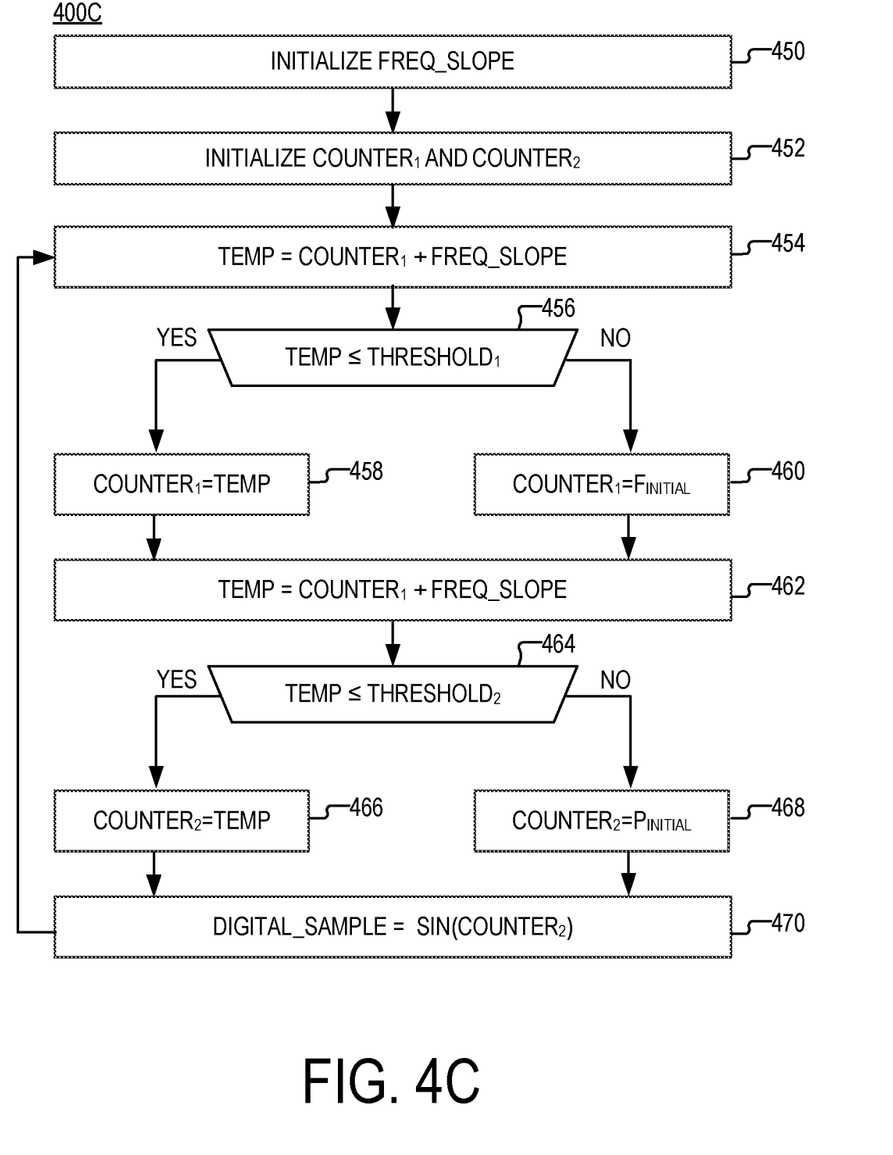
FIG. 4C is a flowchart of an example of a process according to aspects of the disclosure.

FIG. 4C is a flowchart of an example of a process 400C for calculating the chirp signal 107*a*. According to the present example, the process 400C is performed by a general-purpose processor. However, alternative implementations are possible in which the process 400C is performed by another device or architecture. At step 450, a value FREQ_SLOPE is initialized. At step 452, variables COUNTER$_1$ and COUNTER$_2$ are initialized. At step 454, a variable TEMP is set to equal the sum of FREQ_SLOPE and the current value of COUNTER$_1$. At step 456, a determination is made if TEMP is less than or equal to a first threshold (THRESHOLD'). If TEMP is less than or equal to the first threshold, the process 400C proceeds to step 458. Otherwise, the process 400C proceeds to step 460. At step 458, COUNTER$_1$ is set to equal the value of TEMP. At step 460, COUNTER$_1$ is set to equal a value $F_{INITIAL}$. The value $F_{INITIAL}$ may be selected as discussed above with respect to FIGS. 1-4B. At step 462, TEMP is set to equal the sum of COUNTER$_2$ and COUNTER$_1$. At step 464, a determination is made if the TEMP is less than or equal to a second threshold (THRESHOLD$_2$). If TEMP is less than or equal to the second threshold, the process 400C proceeds to step 466. Otherwise, the process 400C proceeds to step 468. At step 466, COUNTER$_2$ is set to equal the value of TEMP. At step 460, COUNTER$_2$ is set to equal a value $P_{INITIAL}$. The value $P_{INITIAL}$ may be selected as discussed above with respect to FIGS. 1-4B. At step 470, a digital sample is generated based, at least in part, on the value of COUNTER$_2$. In some implementations, the digital sample may be generated based, at least in part, by evaluating the sine of COUNTER$_2$. After the digital sample is calculated, the digital sample may be provided to a DAC for output as part of the chirp signal 107*a*. Afterwards, the process 400C returns to step 454 and another digital sample of the chirp signal 107*a* is calculated.

Figure 5A:
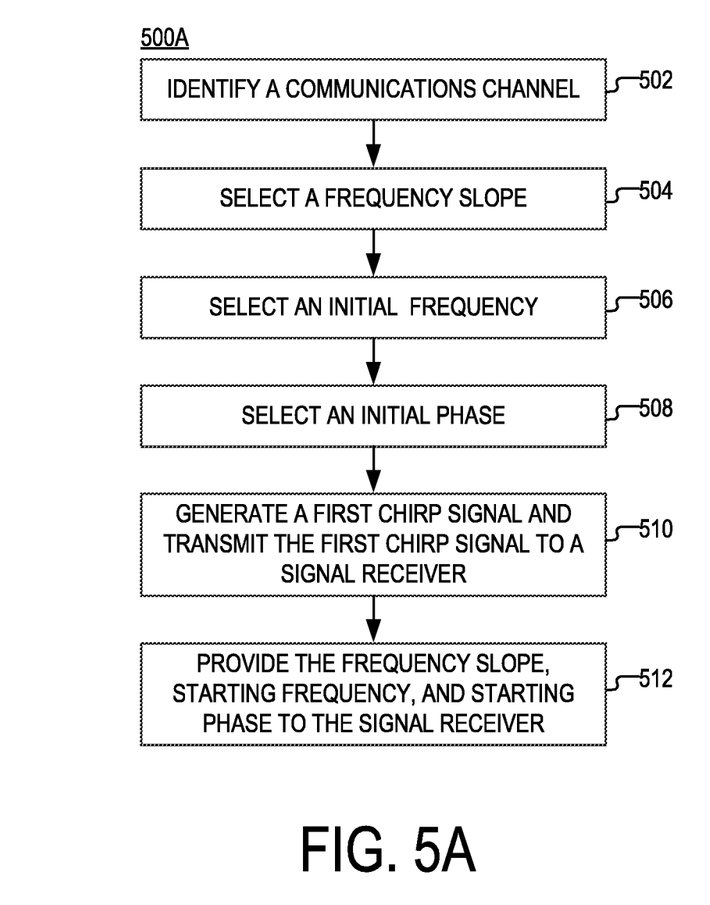
FIG. 5A is a flowchart of an example of a process according to aspects of the disclosure.

FIG. 5A is a flowchart of an example of a process 500A, according to aspects of the disclosure. According to the example of FIG. 5A, the process 500A is performed by a signal source, such as the signal source 102, which is discussed above with respect to FIGS. 1-4C. However, it will be understood that the present disclosure is not limited to any specific type of device executing the process 500A.

At step 502, the signal source identifies a communications channel to test (and/or calibrate). According to the example of FIG. 5A, the communications channel is the same or similar to the communications channel 106, which is discussed above with respect to FIGS. 1-4C. In some implementations, the communications channel may be identified in response to the signal source receiving a user input instructing the signal source to begin testing the communications channel. In some implementations, identifying the communications channel may include extracting an identifier corresponding to the communications channel from the user input. Additionally or alternatively, in some implementations, identifying the communications channel may include retrieving an identifier corresponding to the communications channel from a memory.

At step 504, a frequency slope is selected for a first chirp signal 107*a* that is going to be used to test the communications channel (identified at step 502). The frequency slope may include the rate at which the frequency of the first chirp signal 107*a* changes with respect to time. In some implementations, selecting a frequency slope may include selecting a value, such as a value FREQ_SLOPE (shown in FIGS. 4A-C), by which a first counter (used in the generation in the first chirp signal 107*a*) is going to be incremented. In some implementations, selecting the frequency slope may include receiving a user input specifying the value of the frequency slope. Additionally or alternatively, in some implementations, selecting the frequency slope may include retrieving the frequency slope from a memory.

At step 506, an initial frequency is selected for the first chirp signal 107*a*. The initial frequency may be the frequency of the first chirp signal 107*a* at the beginning of each one of its frequency cycles (e.g., see frequency cycles 126 shown in FIG. 1B, etc.). In some implementations, selecting the initial frequency may include selecting (e.g., retrieving from a memory, etc.) a value, such as a value $F_{INITIAL}$, which specifies the starting value of the first counter that is going to be used in generating the chirp signal 107*a*.

At step 508, an initial phase is selected for the first chirp signal 107*a*. The initial phase may be the phase, which the first chirp signal 107*a* would assume at the beginning of each of its phase cycles (e.g., see phase cycles 131 shown in FIG. 1B). In some implementations, selecting the initial phase may include selecting (e.g., retrieving from a memory, etc.) a value, such as a value $P_{INITIAL}$, which specifies the starting value of a second counter (that is going to be used in generating the chirp signal 107*a*).

At step 510, the first chirp signal 107*a* is generated and transmitted over the communications channel (identified at step 502) to a signal receiver. According to the present example, the first chirp signal 107*a* is generated based on the frequency slope (selected at step 504), the initial frequency (selected at step 506), and the initial phase (selected at step 508). The first chirp signal 107*a* may be generated in accordance with the processes discussed above with respect to FIGS. 4A-C.

At step 512, the signal source provides one or more of the frequency slope (selected at step 504), the initial frequency (selected at step 506), and the initial phase (selected at step 508). In some implementations, generating the first chirp signal 107*a* may include encoding the frequency slope, the initial frequency, and the initial phase in a preamble (or elsewhere) of the first chirp signal 107*a*, and they may be provided together with the first chirp signal 107*a*. Additionally or alternatively, in some implementations, the frequency slope, the initial frequency, and the initial phase may be provided to the signal receiver separately of the chirp signal 107*a*.

Figure 5B:
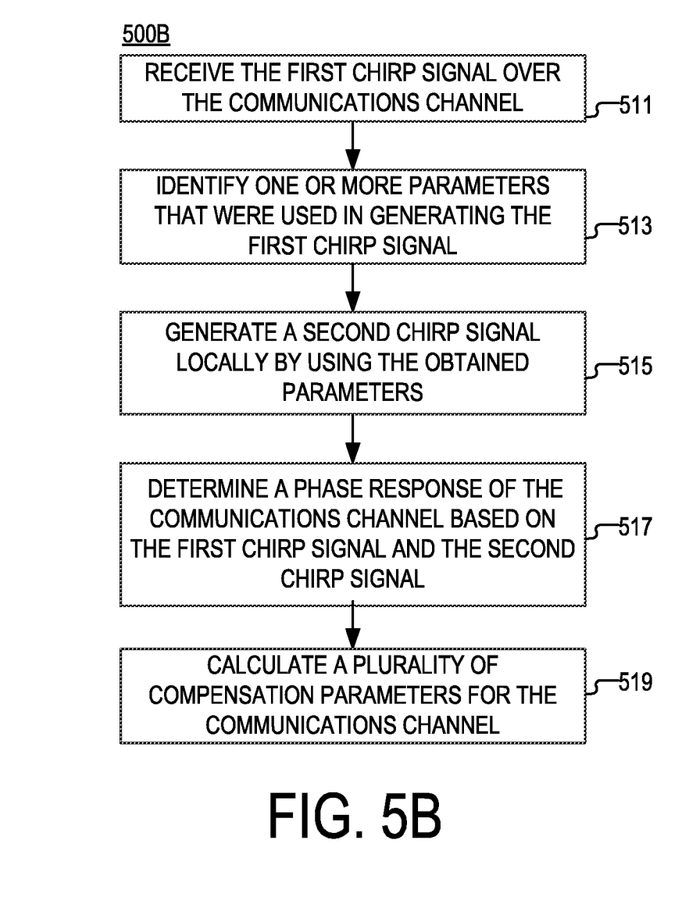
FIG. 5B is a flowchart of an example of a process according to aspects of the disclosure.

FIG. 5B is a flowchart of an example of a process 500B, according to aspects of the disclosure. According to the example of FIG. 5B, the process 500B is performed by a signal receiver, such as the signal receiver 104, which is discussed above with respect to FIGS. 1-4C. However, it will be understood that the present disclosure is not limited to any specific type of device executing the process 500B.

At step 511, the signal receiver 104 receives the first chirp signal 107*a* (transmitted at step 510). According to the present example, receiving the first chirp signal 107*a* may include obtaining a first plurality of digital samples of the first chirp signal 107*a*. According to the present example, each of the first plurality of digital samples is obtained by averaging samples of the first chirp signal 107*a*. In some implementations, the averaging may be performed in the manner discussed with respect to FIG. 1C.

At step 513, the signal receiver 104 identifies one or more parameters that were used in generating the first chirp signal 107*a*. According to the present example, the parameters include one or more of the frequency slope of the first chirp signal 107a (selected at step 504), the starting frequency of the first chirp signal 107a (selected at step 506), the starting phase of the first chirp signal 107a (selected at step 508), and the sampling rate (at the signal source) of the first chirp signal 107a. In some implementations, identifying the one or more parameters may include receiving user input specifying the parameters. Additionally or alternatively, identifying the one or more parameters may include receiving an indication of the one or more parameters from the signal source. Additionally or alternatively, identifying the one or more parameters may include decoding the one or more parameters from a preamble of the first chirp signal 107a. Stated succinctly, the present disclosure is not limited to any specific method for obtaining the one or more parameters of the first chirp signal 107a.

At step 515, the signal receiver 104 generates a second chirp signal 107b based on the obtained parameters of the first chirp signal 107a (identified at step 513). In some implementations, the second chirp signal 107b would ideally be a replica of the first chirp signal 107a, if it were not for one or more of: (i) errors introduced in the first chirp signal 107a by the communications channel used for transmitting the first chirp signal 107a (e.g., non-linear phase shift), (ii) errors introduced in the first chirp signal 107a by transmitting and/or receiving electronics (e.g., linear phase shift), and (iii) errors introduced in the first chirp signal 107a by any other factor that is present in the transmission path of the first chirp signal 107a. According to the example of FIG. 5B, generating the second chirp signal may include generating a second plurality of digital samples. By way of example, in some implementations, the second plurality of digital samples is generated by using any of the processes discussed above with respect to FIGS. 4A-C. However, it will be understood that the present disclosure is not limited to any specific method for generating the second plurality of digital samples. Under the nomenclature of the present disclosure, the first chirp signal 107a may also be referred to as "a received chirp signal" and the second chirp signal 107b may also be referred to as "a calculated chirp signal" or "a generated chirp signal."

At step 517, the signal receiver 104 determines the phase response of the communications channel (identified at step 502). In some implementations, the signal receiver 104 may determine the phase response by calculating the phase of the frequency domain complex I/Q samples of the first 107a and second 107b chirp signals and then subtracting, in the frequency domain, the second chirp signal 107b from the first chirp signal 107a (or vice versa). As noted above, another way to determine the phase response of the communications channel may be to divide I/Q samples of the first 107a and second 107b chirp signals and then use the result to calculate the phase response of the communications channel. For example, the phase response of the channel can be calculated by using Equation 1 below, where:

$$C_{pr} = \arctan\left(\frac{Q_r}{I_r}\right) \quad \text{(Eq. 1)}$$

where Cpr is the phase response of the communications channel, Qr is the quadrature component of the result of the division of the I/Q samples of the first 107a and second 107b chirp signals, and Ir is the in-phase component of the result of the division of the I/Q samples of the first 107a and second 107b chirp signals. Stated succinctly, the present disclosure is not limited to any specific method for calculating the phase response of the communications channel based on the first chirp signal 107a and the second chirp signal 107b.

In some implementations, the difference between the first 107a and second 107b chirp signals may include a linear component and a non-linear component. The non-linear component may be the phase response of the communications channel (identified at step 502), and the linear component may be attributable to delays caused by transmit/receive circuitry, as well as other sources. The linear component and the non-linear component may be separated in a well-known fashion by using a least-square or a D-trend algorithm. Specifically, the least-square or D-trend algorithm may be used to identify the linear component of the difference between the first 107a and second 107b chirp signals; and the non-linear component may be estimated by subtracting the linear component from the difference At step 519, the signal receiver 104 calculates a plurality of compensation parameters for the communications channel (identified at step 502) based on the phase response (identified at step 517). The compensation parameters may be used to correct non-linear phase distortions that are caused by the communications channel (identified at step 502).

The processes described herein may be implemented in hardware, software, or a combination of the two. As used throughout the disclosure, the term "counter" shall refer to one or both of: (i) a variable that is being incremented and (ii) a hardware counter that is incrementing the variable. For example, and without limitation, a hardware counter may include a modulo-N counter. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special-purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of the present disclosure, it will now become apparent that other embodiments incorporating these concepts, structures and techniques may be used. Accordingly, it is submitted that the scope of the present disclosure should not be limited to the described embodiments but rather should be limited only by the spirit and scope of the following claims.

The invention claimed is:

1. A method, comprising:
   generating, by a signal source, a continuous chirp signal, the chirp signal being generated by converting to analog form a plurality of digital samples, each of the plurality of digital samples being calculated, at least in part, by: (i) incrementing a first counter by a frequency slope value, (ii) incrementing a second counter by a current value of the first counter, and (iii) evaluating a periodic function based on a current value of the second counter; and
   transmitting the chirp signal from the signal source to a signal receiver, the chirp signal being transmitted over a communications channel that couples the signal source to the signal receiver, the chirp signal being transmitted as part of a test for detecting a phase response of the communications channel,
   wherein the chirp signal has a frequency that changes in a cyclical pattern, and the first counter is arranged to wrap at an end of each frequency cycle of the chirp signal.

2. The method of claim 1, wherein the second counter is configured to wrap at the end of every other frequency cycle of the chirp signal.

3. The method of claim 1, wherein the first counter, at least in part, implements a frequency accumulator of the signal source and the second counter, at least in part, implements a phase accumulator of the signal source.

4. The method of claim 1, wherein the frequency of the chirp signal varies in synch with a phase of the chirp signal, such that each frequency value in a frequency range of the chirp signal is mapped to at most four phase values in a waveform of the chirp signal.

5. The method of claim 1, wherein the periodic function is a sine function.

6. The method of claim 1, wherein the first counter includes a first modulo-N counter and the second counter includes a second modulo-N counter.

7. The method of claim 1, further comprising transmitting, from the signal source to the signal receiver, an indication of the frequency slope value that is used to generate the chirp signal.

8. The method of claim 1, further comprising receiving, by the signal source, a user input specifying the frequency slope value.

9. A method, comprising:
   receiving a chirp signal at a signal receiver and digitizing the chirp signal to produce a first plurality of digital samples, the chirp signal being received from a signal source over a communications channel;
   generating the chirp signal locally, at the signal receiver, by calculating a second plurality of digital samples, each of the second plurality of digital samples being calculated, at least in part, by: (i) incrementing a first counter by a frequency slope value, (ii) incrementing a second counter by a current value of the first counter, and (iii) evaluating a periodic function based on a current value of the second counter; and
   identifying a phase response of the communications channel based on a difference between the received chirp signal and the generated chirp signal,
   wherein the chirp signal has a frequency that changes in a cyclical pattern, and the first counter is arranged to wrap at an end of each frequency cycle of the chirp signal.

10. The method of claim 9, wherein each of the plurality of first digital samples includes an average sample that is produced by averaging two or more samples of the chirp signal.

11. The method of claim 9, wherein the frequency of the chirp signal varies in synch with a phase of the chirp signal, such that each frequency value in a frequency range of the chirp signal is mapped to at most four phase values in a waveform of the chirp signal.

12. The method of claim 9, wherein the frequency slope value is received at the signal receiver from the signal source, and the frequency slope value is used by the signal source to generate the received chirp signal.

13. The method of claim 9, wherein the periodic function is a sine function.

14. The method of claim 9, wherein the first counter includes a first modulo-N counter and the second counter includes a second modulo-N counter.

15. The method of claim 9, wherein the phase response of the communications channel is determined, at least in part, based on a phase difference between the received chirp signal and the generated chirp signal.

16. An apparatus for generating a cyclical chirp signal, comprising:
   a first modulo counter that is incremented by a frequency slope value;
   a second modulo counter that is incremented by a current value of the first modulo counter, the second modulo counter being incremented once each time the first modulo counter is incremented;
   a computation module that is configured to generate a different respective digital sample each time the second modulo counter is incremented, the respective digital sample being generated, at least in part, by evaluating a periodic function based on a current value of the second modulo counter; and
   a digital-to-analog converter that is configured to receive each respective digital sample that is generated by the computation module, convert the respective digital sample to analog format, and output the converted digital sample as part of the chirp signal,
   wherein the chirp signal has a frequency that changes in a cyclical pattern and the second modulo counter is arranged to wrap at an end of every other frequency cycle of the chirp signal.

17. The apparatus of claim 16, wherein the first modulo counter, at least in part, implements a frequency accumulator and the second modulo counter, at least in part, implements a phase accumulator.

18. The apparatus of claim 16, wherein the frequency of the chirp signal varies in synch with a phase of the chirp signal, such that each frequency value in a frequency range of the chirp signal is mapped to at most four phase values in a waveform of the chirp signal.

19. The apparatus of claim 16, wherein the first modulo counter is arranged to wrap at the end of each frequency cycle of the chirp signal.

20. The apparatus of claim 16 wherein the periodic function is a sine function.

* * * * *